(12) United States Patent
Kochumalayil et al.

(10) Patent No.: US 9,534,096 B2
(45) Date of Patent: Jan. 3, 2017

(54) XYLOGLUCAN FILMS

(75) Inventors: Jobys Kochumalayil, Kista (SE); Sehaqui Houssine, Solna (SE); Zhou Qi, Täby (SE); Lars Berglund, Åkersberga (SE)

(73) Assignee: Stora Easo OYJ, Helsinki (FI)

( * ) Notice: Subject to any disclaimer, the term of this patent is extended or adjusted under 35 U.S.C. 154(b) by 306 days.

(21) Appl. No.: 13/498,882

(22) PCT Filed: Sep. 28, 2010

(86) PCT No.: PCT/SE2010/051044
§ 371 (c)(1),
(2), (4) Date: May 18, 2012

(87) PCT Pub. No.: WO2011/040871
PCT Pub. Date: Apr. 7, 2011

(65) Prior Publication Data
US 2012/0216706 A1    Aug. 30, 2012

Related U.S. Application Data

(60) Provisional application No. 61/246,575, filed on Sep. 29, 2009.

(51) Int. Cl.
| | | |
|---|---|---|
| *C09D 105/00* | (2006.01) |
| *C08J 5/18* | (2006.01) |
| *C08B 37/00* | (2006.01) |
| *C08K 5/00* | (2006.01) |
| *C08K 5/053* | (2006.01) |
| *C08K 5/151* | (2006.01) |
| *C08L 5/14* | (2006.01) |

(52) U.S. Cl.
CPC .............. *C08J 5/18* (2013.01); *C08B 37/0087* (2013.01); *C08K 5/0016* (2013.01); *C08K 5/053* (2013.01); *C08K 5/151* (2013.01); *C08L 5/14* (2013.01); *C08J 2305/00* (2013.01)

(58) Field of Classification Search
None
See application file for complete search history.

(56) References Cited

U.S. PATENT DOCUMENTS 4,257,768 A *  3/1981  Racciato et al. ................... 8/561
5,089,307 A *  2/1992  Ninomiya et al. ........... 428/35.2
(Continued)

FOREIGN PATENT DOCUMENTS

EP         0400484 A1     12/1990
JP       60-176560 A  *   9/1985
(Continued)

OTHER PUBLICATIONS

Simi et al, Colloid and Polymer Science, 288(3): 297-306 (Jan. 2009).*
(Continued)

*Primary Examiner* — Melissa Swain
(74) *Attorney, Agent, or Firm* — Morrison & Foerster LLP (57) ABSTRACT

The present invention pertains to films comprising xyloglucan, processes for preparing films comprising xyloglucan, as well as various uses of said films as for instance packaging material. Specifically, the present invention relates to xyloglucan films having advantageous properties relating to inter alia tensile strength, elastic modulus, and strain-to-failure.

17 Claims, 9 Drawing Sheets

(56) References Cited

U.S. PATENT DOCUMENTS

| | | | |
|---|---|---|---|
| 6,197,318 B1 * | 3/2001 | Abe | A61K 8/73 424/195.18 |
| 6,406,530 B1 * | 6/2002 | Bengs et al. | 106/137.1 |
| 2004/0096569 A1 | 5/2004 | Barkalow et al. | |
| 2004/0249066 A1 * | 12/2004 | Heinzman | C08K 5/0025 525/54.3 |
| 2005/0182196 A1 * | 8/2005 | Khemani et al. | 525/178 |
| 2006/0210610 A1 * | 9/2006 | Davidson et al. | 424/439 |
| 2009/0123767 A1 * | 5/2009 | Gohil et al. | 428/458 |

FOREIGN PATENT DOCUMENTS

| | | | |
|---|---|---|---|
| JP | 05230101 A | * | 9/1993 |
| JP | 05230101 A | * | 9/1993 |
| JP | 2009-196961 A | | 9/2009 |

OTHER PUBLICATIONS

International Search Report and Written Opinion received for PCT Patent Application No. PCT/SE2010/051044, mailed on Jan. 4, 2011, 13 pages.

Kochumalayil et al., "Tamarind Seed Xyloglucan—a Thermostable High-performance Biopolymer from Non-food Feedstock", Journal of Materials Chemistry, vol. 20, 2010, pp. 4321-4327.

Tommonaro et al., "Chemical Composition and Biotechnological Properties of a Polysaccharide from the Peels and Antioxidative Content from the Pulp of Passiflora Liguralis Fruits", Journal of Agricultural and Food Chemistry, vol. 55, No. 18, 2007, pp. 7427-7433.

O'Toole, "Characteristics and Use of Okara, the Soybean Residue from Soy Milk Productions—A Review," J. Agric. Food Chem., 1999, pp. 363-371, vol. 47, No. 2.

International Preliminary Report on Patentability received for PCT Patent Application No. PCT/SE2010/051044, mailed on Apr. 12, 2012, 18 pages.

Office Action received for Chinese Patent Application No. 201080048955.4, mailed on Nov. 3, 2015, 10 pages (English Translation only).

* cited by examiner

XYLOGLUCAN FILMS

CROSS REFERENCE TO RELATED APPLICATIONS

This is a U.S. National Phase patent application of PCT/SE2010/051044, filed Sep. 28, 2010, which claims priority to U.S. Provisional Patent Application No. 61/246,575, filed Sep. 29, 2009, each of which is hereby incorporated by reference in the present disclosure in its entirety.

TECHNICAL FIELD

The present invention pertains to films comprising xyloglucan, processes for preparing films comprising xyloglucan, as well as various uses of said films as for instance packaging material.

BACKGROUND ART

Increased usage of biopolymers from renewable resources is highly desirable in the current strive in society towards sustainable development. Biopolymers from renewable resources exhibit considerable advantages in terms of for instance reduced carbon dioxide emissions, biodegradation, and reduced toxicity. Wood and polysaccharides such as cellulosic fibers and starch constitute the currently most commonly used polymeric materials from renewable resources. Except for fibrous cellulosics, starch is the most commonly utilized plant-based biological polymer for large-scale industrial applications, such as coatings, adhesives, and packaging. In spite of the commercial and industrial success of starch as a biopolymer, it has several drawbacks such as moisture sensitivity and brittleness. The disadvantages associated with starch relate predominantly to the molecularly mixed starch composition comprising both amylopectin and amylose structures, meaning that intermolecular cohesive interactions and toughness-enhancing physical entanglement are limited. Retrogradation, i.e. increased degree of crystallinity with time, is another problem associated with starch-based plastics. Furthermore, ethical issues have been raised with regards to the use of starch, since major starch sources, such as corn and potato, are also used as food.

Starch can converted into 'thermoplastic' starch (TPS), which is readily processable by a number of commonplace techniques, for instance extrusion, injection molding, and film blowing. Among starch components, amylose shows much better mechanical properties than the brittle amylopectin. Nevertheless, since amylose is always present in plants as a mixture with amylopectin, amylose purification would increase the costs. Since starch and starch blends are becoming widely used in applications such as packaging materials and biocomposites, it is of profound interest to explore alternative water-soluble biopolymers with improved property characteristics from nonfood resources.

SUMMARY OF THE INVENTION

There are consequently substantial needs in the art for providing alternatives to starch-based material. To this end, a polysaccharide obtained from the seed of tamarind (*Tamarindus indica*) with its distinct material properties in comparison with starch will be introduced as a novel biopolymer matrix in technological applications. The present invention aims to fulfil the above-identified needs as well as other significant drawbacks within the art, through providing, inter alia, xyloglucan films with tremendous utility as packaging material, barrier layer, bioplastics and/or matrix polymer, as well as processes for preparing said xyloglucan films.

In a first aspect, the present invention relates to a film comprising xyloglucan, which is characterized in that said film may have: (i) a tensile strength that may range from 20 to 100 MPa at 50% relative humidity (RH), (ii) a strain to failure that may range from 2 to 10% at 50% RH, and (iii) an elastic modulus that may range from 1 to 8 GPa at 50% RH. In one embodiment, the tensile strength may be approximately 45-80 MPa, the strain to failure may be approximately 4-8%, and the elastic modulus may be approximately 2.5-5 GPa, all at 50% RH. In a second aspect, the present invention pertains to processes for obtaining xyloglucan-based films, as well as, in a third aspect, products obtainable by the processes in line with the invention.

In a fourth aspect, the present invention relates to the use of films comprising xyloglucan as packaging materials and/or as barrier layers and/or as bioplastics and/or as matrix polymers.

The xyloglucan films of the present invention exhibit highly desirable tensile strength, strain-to-failure, and elastic modulus, together with low moisture sensitivity and no retrogradation problems, as commonly seen with semicrystalline starch. Importantly, xyloglucan films in accordance with the present invention exhibit advantageous properties over a large range of relative humidity, implying significant utility for numerous industrial and commercial applications.

Further, a number of other polysaccharide polymers, for instance commonly used starch bioplastics, degrade thermally prior to the glass transition, whereas xyloglucan, as surprisingly found by the present inventors, displays a substantially higher thermal stability.

Additionally in line with the present invention, the processes for making the xyloglucan films provides a facile way of rapidly obtaining tough, often transparent, and highly useful films from an abundant natural source of polysaccharide, meaning that the present invention satisfy a significant need within the art.

DETAILED DESCRIPTION OF THE INVENTION

The present invention pertains to films comprising xyloglucan, processes for preparing films comprising xyloglucan, as well as various uses of said xyloglucan films as for instance packaging material, barrier layer, bioplastics and/or as matrix polymers.

Where features, embodiments, or aspects of the present invention are described in terms of Markush groups, a person skilled in the art will recognize that the invention may also thereby be described in terms of any individual member or subgroup of members of the Markush group. The person skilled in the art will further recognize that the invention may also thereby be described in terms of any combination of individual members or subgroups of members of Markush groups. Additionally, it should be noted that embodiments and/or features and/or advantages described in the context of one of the aspects and/or embodiments of the present invention may also apply mutatis mutandis to all the other aspects and/or embodiments of the invention. For example, the plasticizers described in connection with one aspect/embodiment may naturally also apply mutatis mutandis in the context of other aspects/embodiments of the invention, all in accordance with the present invention per se.

All words and abbreviations used in the present application shall be construed as having the meaning usually given to them in the relevant art, unless otherwise indicated. For clarity, some terms are however specifically defined below.

Figure 1:
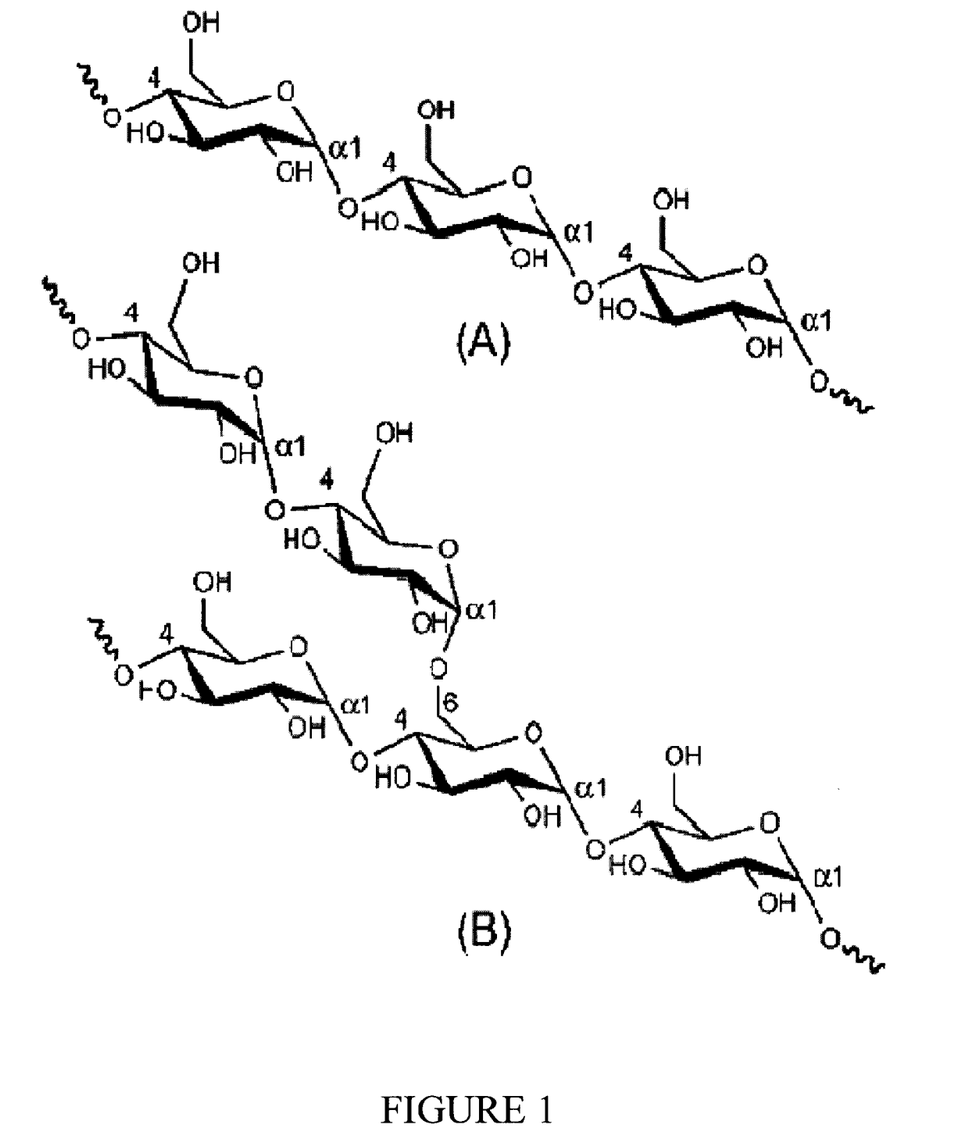
FIG. 1 illustrates representative partial structures of amylose (A), amylopectin (B), and xyloglucan (C).

Tamarind seed xyloglucan is a polymer with a monomer of mainly three sugars—glucose, galactose, and xylose in a molar ratio of 3:1:2. As will be apparent from the description and the examples, the term "xyloglucan" shall be understood to pertain to non-starch polysaccharides composed of a beta(1→4)-linked glucan backbone (as in cellulose) substituted with alfa(1→6)-linked xylose, which is partially substituted by beta(1→2)-linked galactosyl residues. FIG. 1 shows a representative partial structure of amylose (A), amylopectin (B), and xyloglucan (C). In the context of the present invention, the xyloglucan polymers may for instance derive from the seeds of the brown pod-like fruits from the tamarind tree (*Tamarindus indica*). Tamarind tree (*tamarindus indica*), found throughout tropics and subtropics produces brown pod-like fruits, which contain pulp and many hard-coated seeds. The seeds contain large proportions (approx. 60%) of a non-starch polysaccharide known as tamarind seed xyloglucan. Other sources may for instance be flour obtained from for instance *Detarium senegalense*, *Aftelia africana*, and *Jatoba*. The xyloglucan polymer is soluble in water, yielding a highly viscous solution.

In a first aspect, the present invention relates to a film comprising xyloglucan, which is characterized in that said film may have: (i) a tensile strength that may range from 20 to 100 MPa at 50% relative humidity (RH), (ii) a strain to failure that may range from 2 to 10% at 50% RH, and (iii) an elastic modulus that may range from 1 to 8 GPa at 50% RH. In one embodiment, the tensile strength may be approximately 50-80 MPa, the strain to failure may be approximately 4-8%, and the elastic modulus may be approximately 2.5-5 GPa, all at 50% RH.

In a further embodiment, the film may have a tensile strength of at least approximately 100 MPa in the dry state and/or of at least approximately 60 MPa at 15% RH and/or of at least approximately 55 MPa at 74% RH and/or of at least approximately 40 MPa at 92% RH and/or of at least approximately 25 MPa at 99% RH.

In yet another embodiment of the present invention, the film may have strain to failure of at least 2% in dry state and/or of at least 3% at 15% RH and/or of at least 6.5% at 74% RH and/or of at least 9.2% at 92% RH and/or of at least 7.5% at 99% RH.

In an additional embodiment in accordance with the present invention, the film may have elastic modulus of at least 5.5 GPa in dry state and/or of at least 5 GPa at 15% RH and/or of at least 3.7 GPa at 74% RH and/or of at least 2.4 GPa at 92% RH and/or of at least 1.6 GPa at 99% RH.

An RH of approximately 0-75% constitutes the most important humidity interval from a practical perspective, and, as can be seen from the above-outlined parameters and from the experimental section, the xyloglucan films of the present invention exhibit highly desirable tensile strength, strain-to-failure, and elastic modulus in this range, but also at even higher RH values. Further, as can be seen from FIG. 2, the equilibrium moisture content of the xyloglucan films as per the present invention is much lower than for starch-based films, potentially due to the smaller number of hydroxyl groups in the xyloglucan polymer, implying additional advantages as compared with starch-containing films. Additionally, the mechanical properties of the xyloglucan films appear to be substantially less affected by moisture than the mechanical properties of for instance starch-based films, albeit direct comparisons being difficult to carry out.

The xyloglucan films of the present invention displays clearly superior properties compared to most other polysaccharide-based films. For instance, at 50% RH and 23 degrees C., the steady-state moisture is only 10%, approximately 35% lower than for starch. Further, at the same conditions, Young's modulus is as high as 4.3 GPa and the ultimate strength is 60 MPa, and the strain-to-failure is 5%. These properties are very high for a polymer, and at least as high as for pure amylose extracted from starch, although the retrogradation problem with semicrystalline amylose is absent. Further, in practice, amylose is almost always present together with amylopectin, which decreases mechanical performance, increases moisture adsorption, and results in lower thermal stability. The xyloglucan films disclosed by the present inventors consequently clearly possess superior properties than most polysaccharide films in industrial use today.

The inventors behind the present invention have surprisingly discovered that the thermal and mechanical properties of xyloglucan are highly advantageous, for instance in comparison with the properties of other commonly utilized polysaccharide polymers, such as starch (or its components amylose and amylopectin) and cellulose. Amylose and amylopectin, for example, degrade thermally prior to the glass transition, whereas xyloglucan displays a substantially higher thermal stability.

All the xyloglucan films of the present invention, i.e. both the films that comprise plasticizers and the native xyloglucan films, possess excellent film-forming and film properties per se, displaying desirable values for parameters such as tensile strength, elastic modulus, and strain-to-failure. Without wishing to be bound by any particular theory, it is surmised that strong intramolecular interactions and low free volume contribute to the advantageous properties displayed by xyloglucan.

In one embodiment in accordance with the present invention, the xyloglucan films comprise only xyloglucan and essentially no other components (for instance plasticizers and/or other polysaccharides than xyloglucan). Thus, the present invention also relates to xyloglucan films substantially completely devoid of other components, but still maintaining superior properties with regard to elastic modulus, strain-to-failure, and tensile strength. Additional advantages associated with films comprising only xyloglucan, i.e. films essentially completely devoid of components intentionally added to said films, pertain to ease of preparation, reduced risk of additional components being released from the films, etc.

In a further embodiment in accordance with the present invention, the galactose residues of the xyloglucan may be, at least partially, removed. The removal may be effected through the use of enzymatic digestion, for instance beta-galactosidase treatment, for example using beta-galactosidase from *Aspergillus oryzae*. Removal of the galactose residue may result in advantageous film properties but it may also aid in the formation of the xyloglucan films.

In yet another embodiment, the film comprises at least one plasticizer, which may be present in the film in order to optimize the properties of the film per se, as well as to facilitate processing and production. The at least one plasticizer may be selected from the group comprising glycerol, sorbitol, urea, poly(ethylene glycol), sucrose, glucose, fructose, xylose, water, and any combination thereof. In a further embodiment, the at least one may be present in a concentration ranging from 1% by dry weight to 99% by dry weight, most preferably 10-40% by dry weight. The plasticizers utilized in the context of the present invention may provide advantages relating to for instance tensile strength, elastic modulus, and strain-to-failure. Glycerol, for instance, plasticize xyloglucan at a content of only 10 wt %, and strain-to-failure is increased with plasticization. Water, as well as remaining plasticizers, is efficiently plasticizing xyloglucan at different concentrations, implying that the system is very flexible and easily optimized vis-à-vis for instance various physical properties using different plasticizers or different combinations of plasticizers.

The weight average molecular weight ($M_w$) of the xyloglucan may, in a further embodiment in line with the present invention, range from approximately 10 000 g/mol (10 kDa) to approximately 3 000 000 g/mol (3 MDa), preferably from approximately 50 kDa to approximately 3 MDa. The molecular weight of the xyloglucan confers certain properties to the film, and the molecular weight may thus be selected depending on the desired properties and the future applications of the xyloglucan film. The inherent physico-chemical properties of the xyloglucan polymer render xyloglucan highly dissolvable in cold water and other aqueous solutions, even at a relatively high molecular weight (for instance around 2.5 MDa). As a result, the properties of xyloglucan films can be extensively controlled and modulated only by varying the molecular weight.

In a further embodiment, the xyloglucan films in accordance with the present invention may, when the thickness of the film is approximately 50 microns, have a transmittance at 600 nm wavelength of at least 80%, preferably of at least 90%, meaning that said film displays a highly advantageous transparency The transmittance value describes the transparency of the film, and numerous substantial advantages are associated with the transparent xyloglucan films of the present invention as a result of their high level of transmittance.

In yet an additional embodiment as per the present invention, the xyloglucan film may further comprise alginate or carboxymethyl cellulose (CMC), in order to potentially improve properties relating to film-formation and toughness. The amount of CMC may for instance be in the range from approximately 1 wt % to 99 wt %, preferably 10 wt % to 50 wt %. In accordance with the present invention, a xyloglucan film comprising 20 wt % CMC may exhibit a tensile strength of at least approximately 101 MPa, tensile strain at break of at least approximately 20%, and elastic modulus of at least approximately 4.7 GPa.

The present invention further relates to processes for obtaining films as per the above-described aspects and embodiments. The process comprises the steps of dissolving xyloglucan in aqueous solvent and forming a film through evaporating the aqueous solvent. In a further embodiment, the concentration of the dissolved xyloglucan in the aqueous solvent is between 0.05% by dry weight and 10% by dry weight.

In an additional embodiment, the second step of forming a film through evaporating the aqueous solvent may be carried out using film casting, solvent casting, and/or coating over substrate materials selected from the group comprising glass, polymer, metal, paper, and any combination thereof.

In accordance with an additional embodiment of the present invention, at least one plasticizer may be dissolved in the aqueous solvent, in order to facilitate processing. The plasticizer may be dissolved in the aqueous solvent before, after, or simultaneously with xyloglucan. In a further embodiment, the step of dissolving xyloglucan in the aqueous solvent may be carried out at between approximately 5° C. and approximately 100° C., preferably at approximately 20-60° C. In yet another embodiment, the step of dissolving xyloglucan in the aqueous solvent may be carried out for between approximately 1 minute and approximately 48 hours, preferably approximately 1-3 hours.

A further aspect in accordance with the present invention relates to a product obtainable by the processes described hereinbefore.

In yet an additional aspect, the present invention pertains to the use of a film comprising xyloglucan as described hereinbefore in a packaging material and/or as a barrier layer and/or as a bioplastic and/or as a matrix polymer.

EXAMPLES

Purification of Xyloglucan

Xyloglucan, containing 5-10% impurities, was obtained from Innovasynth Technologies Ltd. (India). A 0.5% by dry weight, inter alia, xyloglucan solution was prepared in distilled water. The solution was mechanically stirred at 60 degrees C. for 2 h. The water-insoluble protein fraction was removed by centrifugation at 4500 rpm for 30 min, followed by filtration with a Buchner funnel using glass microfiber filters (Whatman GF/A, pore size, 1.6 micrometer). The filtrate solution was freeze-dried to obtain pure xyloglucan for further experiments.

Enzymatic Modification of Xyloglucan

In order to study the effect of galactose residue in the side chains of xyloglucan, galactose was partially removed by using beta-galactosidase (from *Aspergillus oryzae*, Sigma Aldrich). The digestion was carried out by mixing 3 wt % aqueous xyloglucan solution containing 10 g xyloglucan with 1 wt % aqueous enzyme solution containing 500 mg beta-galactosidase at 30 degrees C. The pH of the mixture was adjusted to 4.5 with 0.1 M sodium acetate buffer. The reaction was terminated after 18 h by heating at 90 degrees C. for 30 min to deactivate the enzyme. The modified xyloglucan (m-xyloglucan) was purified by precipitation in ethanol and dried in a vacuum oven at 50 degrees C. for 24 h. In order to quantify the galactose content, xyloglucan and m-xyloglucan samples were completely hydrolyzed using endoglucanase digestion in 50 mM sodium acetate buffer at pH 5 and 37 degrees C. for 24 h. High Performance Anion-Exchange Chromatography with Pulsed Amperometric Detection (HPACEPAD) analysis of constituent sugars was performed using a Dionex Carbopac PA100 column on a Dionex ICS-3000 HPLC system controlled by Chromelion software, version 6.80 (Dionex). An optimized gradient program was used for simultaneous analysis of all constituent sugars. The galactose removal ratio was calculated from the amount of remaining galactose residue divided by the amount of original galactose residue.

Film Casting

Aqueous solutions of approximately 0.5-10 wt % xyloglucan were prepared by dissolving the purified xyloglucan in water at approximately 20-60 degrees C. for between approximately 1 minute and 24 hours. After cooling to room temperature and degassing, the solution was evenly casted on a Teflon mould. Films with a thickness of ca. 60 microns were peeled off from the Teflon mould after constrained air drying at ambient conditions for 3-4 days. Subsequently, films were dried in a vacuum oven at 50 degrees C. overnight before further characterization. The films of m-xyloglucan were prepared in the same manner. In order to study the plasticizing effect of glycerol, different amounts of glycerol in the range of 5 to 40 wt % were added and mixed with xyloglucan using magnetic stirring before film casting. Other plasticizers such as sorbitol, maltitol, polyethylene glycol (PEG) and urea were also evaluated.

Water Sorption

A Dynamic Vapour Sorption (DVS) instrument from Surface Measurement Systems was used to determine the water sorption isotherm under different humidity atmospheres. Xyloglucan and m-xyloglucan films were first dried in the DVS cell, and then the relative humidity (RH) in the DVS cell was increased in steps from dry state up to 95%. The samples were weighed in different humidity atmospheres when the saturation point had reached. The moisture content (M) at a particular RH level was calculated on a dry (or total weight) basis, as indicated by the formula below.

$$M = \frac{W_w W_d}{W_d} \times 100\%$$

where M is the moisture content (%) of material, Ww is the weight of the sample in the DVS cell when the water content has reached steady state condition, and Wd is the weight of the dried sample. In order to analyze the effect of environmental humidity on mechanical properties, native and plasticized xyloglucan films were cut into strips with a width of 5 mm and stored in closed desiccators over several salt solutions at 23 degrees C. for one week. The saturated salt solutions used (with their corresponding RH at 23 degrees C.) were LiCl (15%), NaClO3 (74%), and KHSO4 (92%), as specified in ASTM E104-85. A 100% RH was obtained by using a closed vessel containing water in its interior. The sample strips kept in different humidity conditions were immediately tested after they were taken out of the desiccators.

Dynamic Mechanical Analysis (DMTA)

DMTA measurements were performed on a dynamic mechanical analyzer (TA Instruments Q800) operating in tensile mode. Typical sample dimensions were 15*5 *0.06 mm³. The measurement frequency and amplitude were kept at 1 Hz and 15 mm, respectively. At a nominal strain of 0.02%, a temperature scan was made in the range 25-300 degrees C. at a heating rate of 3 degrees C. per minute under an air atmosphere. All samples were pre-heated to 105 degrees C. for 20 min to remove any residual moisture in the material. The glass transition was determined by noting the temperature of the tan δ peak and the temperature at which the slope in the modulus changes (the intersection between the steepest slope and the glassy modulus slope).

Tensile Testing

The mechanical properties of vacuum dried and conditioned xyloglucan, m-xyloglucan, and plasticized xyloglucan films were measured using an Instron 4301 testing machine in tensile mode with a 100 N load cell. The specimens were thin rectangular strips (60*5 mm²) and the gauge length was 40 mm. The stress-strain curves of specimen samples were recorded at room temperature and 50% RH at a strain rate of 10% per min. At least six specimens were tested from each sample and results were reported for those specimens that do not show premature failure at the jaw face. Stress-strain curves were plotted, and the Young's modulus (E) was determined from the slope of the low strain region in the vicinity of 0.05% strain. Mechanical tensile data were averaged over at least four specimens.

Results: Xyloglucan and Modified Xyloglucan Films

Casting of polysaccharide films from water solution is often challenging. For instance, xylan extracted from aspen forms brittle films, most likely due to low molar mass. The same is the case with other hemicelluloses where an undesirable amount of plasticizer loading is necessary to form films of acceptable quality. In contrast, all cast xyloglucan films in accordance with the present invention (native xyloglucan control, enzyme-modified xyloglucan, and plasticized xyloglucan) show excellent film-forming characteristics. The cast films were mechanically highly robust, highly transparent and uniformly smooth and flat. This could partly be attributed to the high molar mass of xyloglucan, around 2.5 MDa. Despite the high molar mass, xyloglucan shows a high degree of dissolution in cold water. X-Ray diffractograms of native xyloglucan and plasticized xyloglucan films exhibit a broad halo centered at 2θ=19.5, confirming the completely amorphous nature of xyloglucan. The enzymatically modified xyloglucan (m-xyloglucan), in which 25-30% of galactose was removed, showed gelation at the concentration of around 1 wt %, as indicated by visual turbidity changes and by absorption changes using ultraviolet-visible spectroscopy.

Hygrothermal Properties

Figure 2:
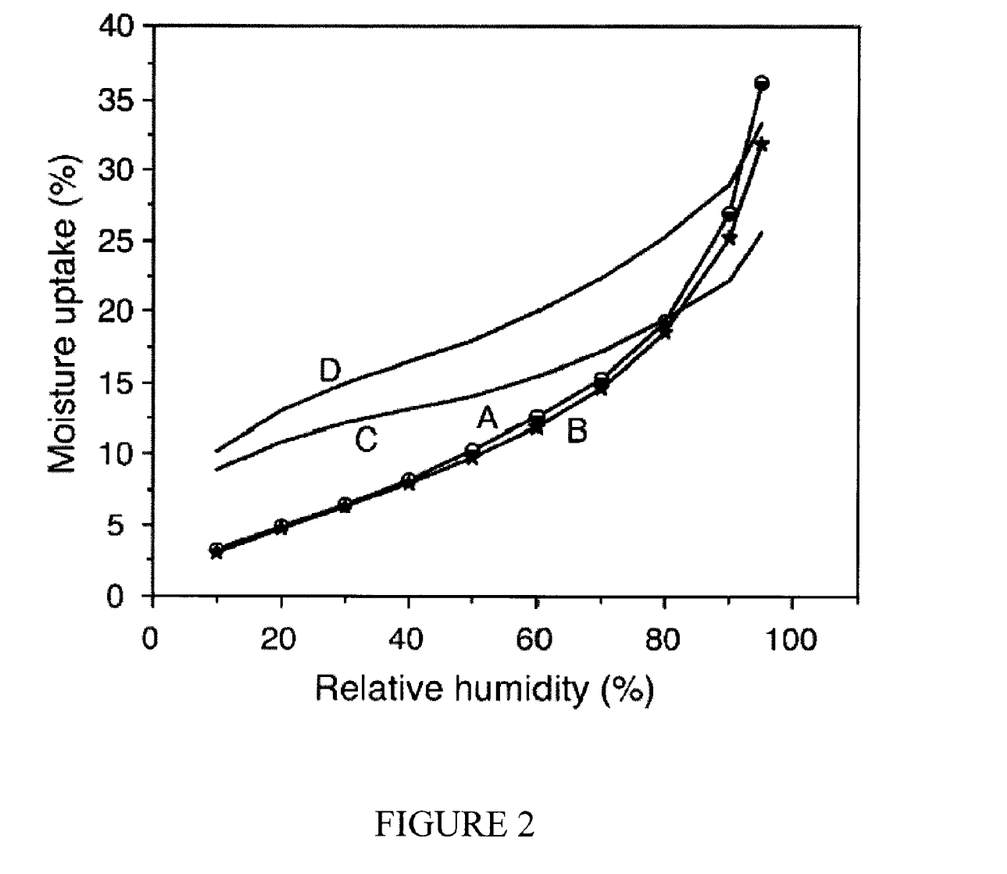
FIG. 2 plots water sorption isotherms of xyloglucan compared with various other polysaccharides.
Figure 3:
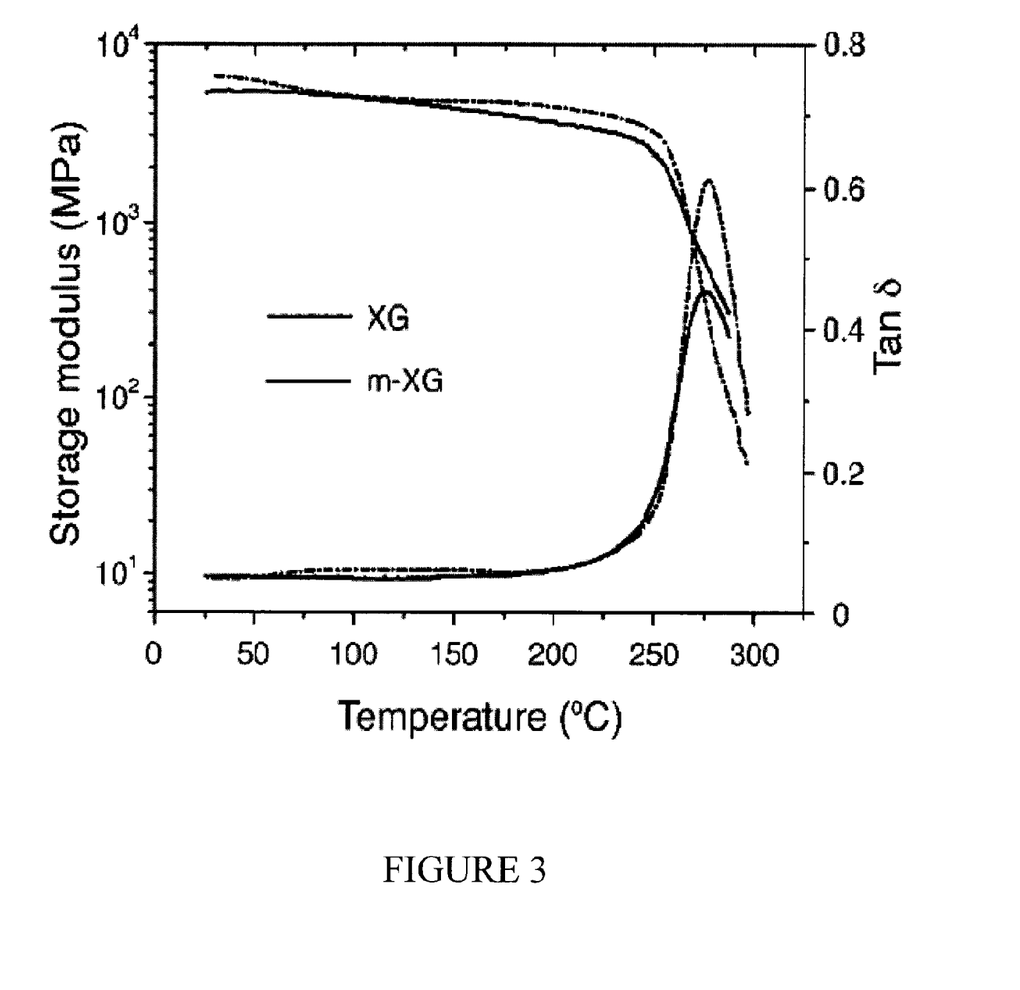
FIG. 3 plots storage modulus and tan δ for xyloglucan and m-xyloglucan films at 1 Hz.

Moisture sorption isotherms are presented in FIG. 2 for native xyloglucan and m-xyloglucan in comparison with waxy maize starch, and potato starch. It is evident from FIG. 2 that the equilibrium moisture content of xyloglucan films is much lower than that for the starches in the practically very important relative humidity range 0-70%. This is also confirmed by comparisons with previously published pure amylose and amylopectin data. Data from DMTA analysis are presented in FIG. 3 for xyloglucan and m-xyloglucan in the form of storage modulus (E') and tan δ plots versus temperature. Xyloglucan and m-xyloglucan maintain a storage modulus of around 6 GPa from room temperature up to 250 degrees C. where xyloglucans start to soften. Amylose and amylopectin degrade thermally prior to the glass transition, and, apparently, xyloglucan is much more stable in this respect although the reason for higher thermal stability compared with amylose is unclear. The small differences in FIG. 3 between xyloglucan and m-xyloglucan are difficult to interpret in molecular terms. The reduced tan δ peak height for m-xyloglucan indicates that a smaller volume fraction of the polymer contributes to the glass transition. Similarly, the corresponding DMTA-data for glycerol-plasticized xyloglucan films are presented in FIG. 4. For 10.4 wt % glycerol, the expected downward shift in Tg is observed as small and highly soluble glycerol molecules are added. The onset of the rubbery plateau can be clearly observed from the storage modulus curve in FIG. 4(A).

Figure 4:
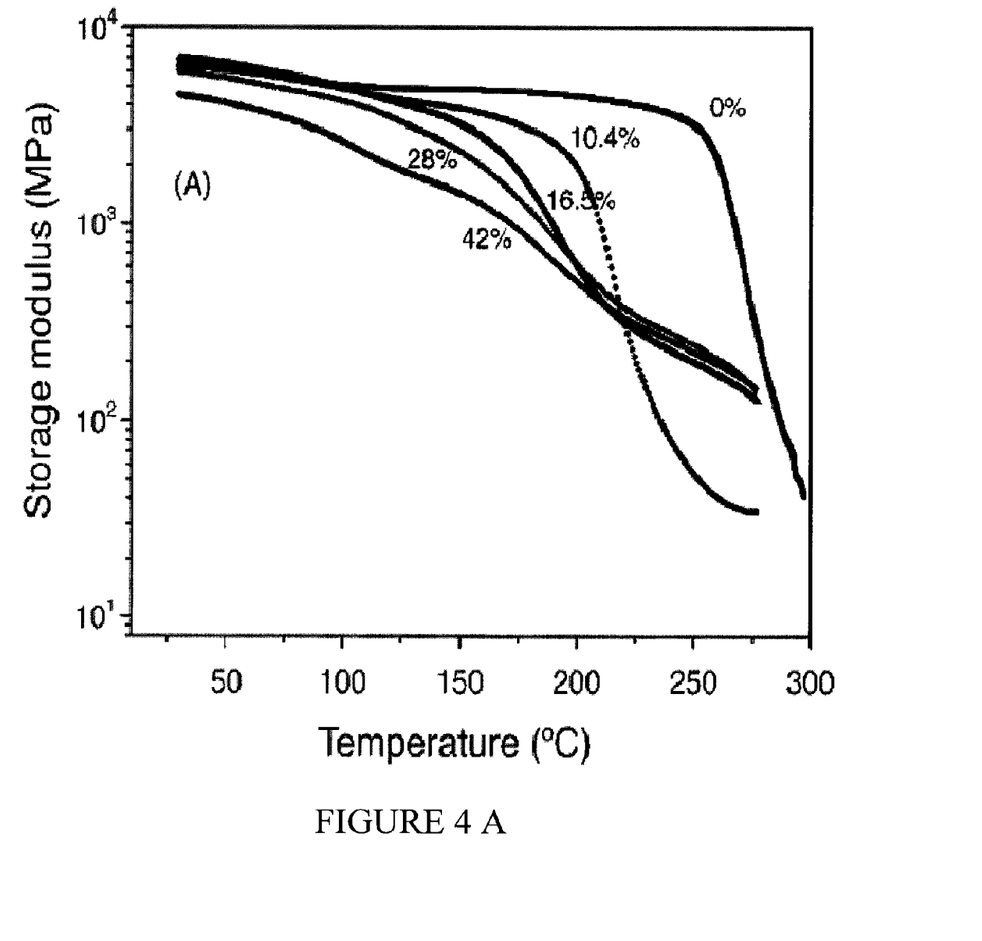
FIG. 4 shows storage modulus (A) and tan δ (B) as a function of temperature and glycerol content for certain glycerol-plasticized xyloglucan films at 1 Hz.

The "glass transition" is much more gradual and no rubbery plateau is reached, which can be seen from FIG.

4(B). Further, the onset of mechanical relaxation at about 260 degrees C. is the glass transition of xyloglucan. This is higher than commonly estimated Tg-values for amylose and amylopectin. The Tg of dry amylopectin and amylose is around 230 degrees C. based on extrapolation of the glass transition temperatures of malto-oligosaccharides and on extrapolation of data for polysaccharide/plasticizer mixtures. In effect, the Tg of dry starch is experimentally inaccessible due to thermal degradation prior to the transition. In the plasticized state, the amylose/amylopectin ratio strongly influences the glass transition behavior of starch systems. Products containing a higher amount of amylopectin (for instance, waxy maize) have higher Tg than materials with less amylopectin. The Tg values of plasticized xyloglucan samples are reported in Table 1.

TABLE 1

Temperatures characterizing the mechanical relaxation in XG-glycerol films observed in dynamic measurements at 1 Hz.

| Glycerol content (% w/w) | $T_g{}^a$ (° C.) | Tan. δ peak (° C.) |
|---|---|---|
| 0 | 251 | 261 |
| 10.4 | 199 | 224 |
| 16.5 | 166 | 200 |
| 28 | 158 | 202 |
| 42 | 161 | 193 |

$^a$Based on E' = f(T).

Mechanical Properties in Uniaxial Tensile Loading

Figure 5:
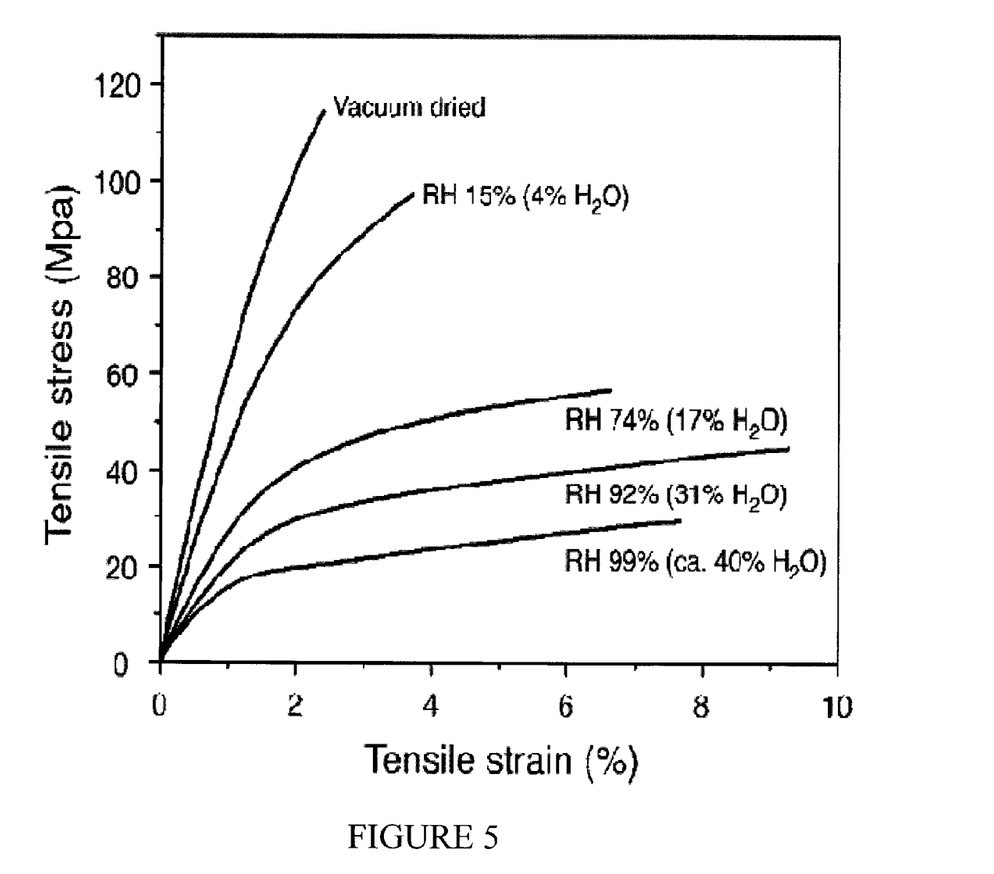
FIG. 5 plots tensile stress-strain curves of xyloglucan films conditioned at room temperature and at different relative humidity atmospheres.

The use of xyloglucan in industrial bioplastics and biocomposites applications would mean exposure to ambient conditions and a certain relative humidity. It is therefore important to characterize the effect of adsorbed moisture (see FIG. 2) on the stress-strain behavior of xyloglucan. The specimens were conditioned to steady state conditions. In FIG. 5, stress-strain curves are presented for xyloglucan-films subjected to different relative humidities at room temperature. Data for tensile strength, strain to failure, and elastic modulus of certain xyloglucan films are summarized in Table 2.

TABLE 2

Mechanical properties of certain plasticized xyloglucan using data obtained from tensile tests (values in parenthesis are standard errors).

| Sample condition | Tensile strength, MPa | Strain to failure, % | Elastic modulus, GPa |
|---|---|---|---|
| Vacuum dried | 114 (12.0) | 2.7 (0.6) | 5.95 (0.83) |
| RH 15% (4% H$_2$O) | 64 (5.6) | 6.6 (3.6) | 5.07 (0.24) |
| RH 74% (17% H$_2$O) | 56 (3.1) | 6.4 (0.5) | 3.67 (0.23) |
| RH 92% (31% H$_2$O) | 45 (4.7) | 9.2 (0.7) | 2.36 (0.71) |
| RH 99% (ca. 40% H$_2$O) | 28 (6.4) | 7.5 (1.1) | 1.63 (0.31) |

As moisture is adsorbed, FIG. 5 and Table 2 exhibit the effects on the stress-strain behavior of certain xyloglucan films. Although direct comparisons are difficult, the mechanical properties of xyloglucan appear to be much less sensitive to moisture than starch. There are two reasons for this. The moisture content of xyloglucan is lower than in starch at similar relative humidity, see FIG. 2. In addition, the mechanical behavior is less sensitive to the presence of moisture, as indicated by the behavior of specimens in FIG. 5 exposed to high relative humidities. High molar mass and the associated physical entanglements are an advantage, and it is possible that intermolecular interactions between xyloglucan molecules are still quite high despite the presence of adsorbed moisture. In highly plasticized starch systems, the sensitivity of mechanical properties to adsorbed moisture is very high. The stress-strain curves of selected plasticized xyloglucan films are presented in FIG. 6, and their mechanical property data are summarized in Table 3.

TABLE 3

Mechanical properties of plasticized XG determined from tensile tests (values in parenthesis are standard errors).

| Glycerol content, wt % | Sample condition | Tensile strength, MPa | Strain to failure, % | Young's, modulus, GPa |
|---|---|---|---|---|
| 0 | Vacuum dried | 114 (12.0) | 2.7 (0.6) | 5.95 (0.8) |
| 0 | 50% RH | 61 (8.6) | 4.8 (3.6) | 4.30 (0.2) |
| 10 | Vacuum dried | 102 (2.8) | 2.5 (0.1) | 5.12 (0.4) |
| 10 | 50% RH | 49 (0.1) | 7.2 (1.0) | 2.53 (0.2) |

Figure 6:
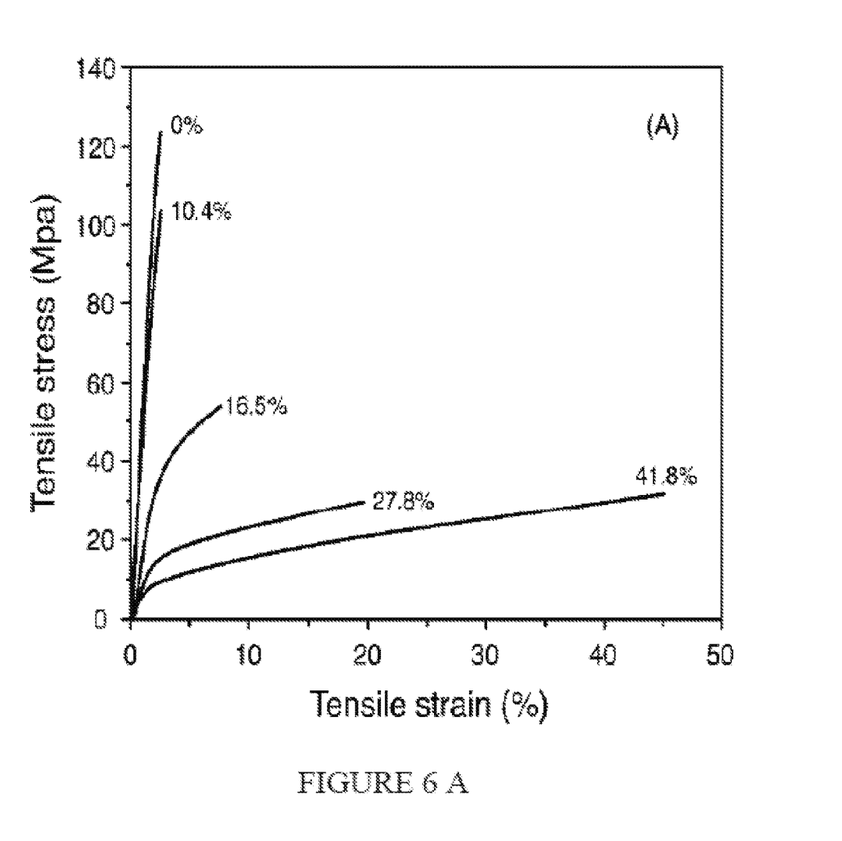
FIG. 6 illustrates tensile stress-strain curves of glycerol-plasticized tamarind seed xyloglucan films, (A) vacuum dried (B) conditioned at 50% RH and 23 degrees C.

At 55% RH, FIG. 6(B), the effect of 10 wt % glycerol is very favorable with increased ductility while the strength and modulus are still as high as 50 MPa and 2.5 GPa, respectively. This favorable plasticization at low glycerol content is quite interesting, since it has been reported that the strain-to-failure of amylose decreased after the addition of 9 wt % glycerol, with the reason probably being antiplasticization of starches at low glycerol contents. Under high plasticizer loading, as a specific comparison, amylose films with 30 wt % glycerol show a tensile strength of 10 MPa. The corresponding amylopectin film plasticized with 30 wt % glycerol has completely lost its strength. Meanwhile, even at a glycerol content of 40 wt %, plasticized xyloglucan shows a substantial strength. The tensile strength may be about 10% higher for the m-xyloglucan, although molecular mechanisms for this enhancement are unclear. The biopolymers were also successfully plasticized with 30 wt % glycerol.

The invention claimed is:

1. A film comprising:
   at least 90% xyloglucan by dry weight, wherein said xyloglucan is derived from tamarind seed and wherein said film has:
   (i) a tensile strength of 45-80 MPa at 50% relative humidity (RH),
   (ii) a strain to failure of 4-8% at 50% RH, and
   (iii) an elastic modulus of 2.5-5 GPa at 50% RH.

2. The film according to claim 1, characterized in that said film has a tensile strength of at least 100 MPa in dry state and/or at least 60 MPa at 15% RH and/or of at least 55 MPa at 74% RH and/or of at least 40 MPa at 92% RH and/or of at least 25 MPa at 99% RH.

3. The film according to claim 1, characterized in that said film has a strain to failure of at least 2% in dry state and/or of at least 3% at 15% RH and/or of at least 6.5% at 74% RH and/or of at least 9.2% at 92% RH and/or of at least 7.5% at 99% RH.

4. The film according to claim 1, characterized in that said film has an elastic modulus of at least 5.5 GPa in dry state and/or of at least 5 GPa at 15% RH and/or of at least 3.7 GPa at 74% RH and/or of at least 2.4 GPa at 92% RH and/or of at least 1.6 GPa at 99% RH.

5. The film according to claim 1, characterized in that said film comprises at least one plasticizer.

6. The film according to claim 5, characterized in that said at least one plasticizer is selected from the group comprising glycerol, sorbitol, urea, polyethylene glycol), sucrose, glucose, fructose, xylose, water, and any combination thereof.

7. The film according to claim 5, characterized in that said at least one plasticizer is present in a concentration ranging from 1% by dry weight to 10% by dry weight.

8. The film according to claim 1, characterized in that said xyloglucan has a molecular weight ranging from approximately 10,000 g/mol to approximately 3,000,000 g/mol.

9. The film according to claim 1, wherein a sample of said film having a thickness of approximately 50 micron has a transmittance at 600 nm of at least 80%.

10. The film according to claim 1, wherein the film further comprises either alginate and/or carboxymethyl cellulose.

11. A process for obtaining a film according to claim 1, comprising the steps of:
 (i) dissolving xyloglucan derived from tamarind seed in aqueous solvent, and
 (ii) forming a film through evaporating said aqueous solvent.

12. The process according to claim 11, wherein the concentration of the dissolved xyloglucan in said aqueous solvent is between 0.05% by dry weight and 10% by dry weight.

13. The process according to claim 11, characterized in that step (ii) is carried out using film casting, solvent casting, and/or coating over substrate materials selected from the group comprising glass, polymer, metal, paper, and any combination thereof.

14. The process according to claim 11, characterized in that at least one plasticizer is dissolved in said aqueous solvent before, after, or simultaneously with xyloglucan.

15. The process according to claim 11, characterized in that step (i) is carried out at between approximately 5° C. and approximately 100° C.

16. The process according to claim 11, characterized in that step (i) is carried out for between approximately 1 minute and approximately 48 hours.

17. A packaging material, barrier layer, bioplastic, or matrix polymer comprising a film comprising xyloglucan according to claim 1.

* * * * *